(12) United States Patent
Ren

(10) Patent No.: US 10,231,436 B2
(45) Date of Patent: Mar. 19, 2019

(54) HANDLE OF TOY FOR INTERACTION WITH PET AND SLINGSHOT MOUNTED WITH HANDLE

(71) Applicant: SHENZHEN XINGRISHENG INDUSTRIAL CO., LTD, Shenzhen, Guangdong Province (CN)

(72) Inventor: Dan Ren, Shenzhen (CN)

(73) Assignee: SHENZHEN XINGRISHENG INDUSTRIAL CO., LTD. (CN)

( * ) Notice: Subject to any disclaimer, the term of this patent is extended or adjusted under 35 U.S.C. 154(b) by 348 days.

(21) Appl. No.: 15/308,841

(22) PCT Filed: May 23, 2014

(86) PCT No.: PCT/CN2014/078329
§ 371 (c)(1),
(2) Date: Nov. 4, 2016

(87) PCT Pub. No.: WO2015/176323
PCT Pub. Date: Nov. 26, 2015

(65) Prior Publication Data
US 2017/0064927 A1  Mar. 9, 2017

(51) Int. Cl.
*F41B 3/02* (2006.01)
*A01K 15/02* (2006.01)
*A63H 33/18* (2006.01)

(52) U.S. Cl.
CPC ........... *A01K 15/025* (2013.01); *A63H 33/18* (2013.01); *F41B 3/02* (2013.01)

(58) Field of Classification Search
CPC ....................................................... F41B 3/02
See application file for complete search history.

(56) References Cited

U.S. PATENT DOCUMENTS

| | | | | |
|---|---|---|---|---|
| 844,665 | A * | 2/1907 | Dills ......................... | F41B 3/02 124/20.1 |
| 2,026,199 | A * | 12/1935 | Virneburg ................. | F41B 3/02 124/20.3 |
| 5,579,751 | A * | 12/1996 | Lin ........................... | F41B 3/02 124/1 |
| 7,543,579 | B2 * | 6/2009 | Chang ....................... | F41A 9/64 124/20.1 |
| 8,640,682 | B2 * | 2/2014 | Shirk, II ................ | F41G 11/001 124/20.1 |

* cited by examiner

*Primary Examiner* — John Ricci
(74) *Attorney, Agent, or Firm* — PROI Intellectual Property US

(57) ABSTRACT

A toy slingshot for interacting with pets, comprising a slingshot fork, a rubber band installed on said slingshot fork, a shooting pocket connected to said rubber band, and a handle connected to said slingshot fork, wherein a circular ball sleeve is provided at a lower position within a fork opening a top surface of the circular ball sleeve having a gap, and a plane of said ball sleeve coincides with that of said slingshot fork. Said handle comprises a left half handle and a right half handle, and upper ends of said left half handle and right half handle are fixed to a connector at a bottom portion of said slingshot fork, forming an integrated handle having an internal a cavity. The lower-most end of said handle is connected to a handle cover, and the cavity in said handle holds a cylindrical cookie box.

8 Claims, 11 Drawing Sheets

US 10,231,436 B2

HANDLE OF TOY FOR INTERACTION WITH PET AND SLINGSHOT MOUNTED WITH HANDLE

CROSS REFERENCE TO RELATED APPLICATIONS

The present application is the US national stage of International Patent Application PCT/CN2014/078329 filed on May 23, 2014.

TECHNICAL FIELD

The present invention relates to a device for training or exercising pets, toy equipment for special application, and especially to a toy slingshot with which humans can interact with pets.

BACKGROUND ART

There is a lack of simple toys in the prior art for interacting with pets, and the handles of existing toys only provide a holding function but not any storage function. Similarly, the slingshot in the prior art is also function-limited and cannot be used for anything but shooting off small objects; it cannot be used for training pets, has a lack of novelty and entertainment value; and since it can be used for shooting off small stones, it is relatively unsafe.

SUMMARY OF THE INVENTION

To address the deficiencies of the prior art, the present invention provides a toy handle which provides storage function and can be used for interacting with pets, and on top of that a toy slingshot installed with said handle, wherein said slingshot is used for training or exercising pets and timely offering the pets food-reward. Thus the slingshot is new and interesting and has a relatively high safety factor allowing humans to interactively play with pets.

A technical solution provided by the present invention is to provide a handle of a toy for interacting with pets; particularly, the handle comprises a left half handle and a right half handle, and the upper ends of the left half handle and the right half handle are fixed to a connector at the bottom part of the toy mounted on the handle, forming the whole handle with an internal cavity; the lower-most end of the handle is connected to a handle cover, and the cavity accommodates a cylindrical cookie box.

A further technical solution provided by the present invention is a toy slingshot for interacting with pets, comprising a slingshot fork, a rubber band installed on the slingshot fork, a shooting pocket connected to the rubber band and a handle connected to the slingshot fork, wherein a circular ball sleeve is provided at the lower position within a fork opening, the top surface of the circular ball sleeve having a gap and the plane of the ball sleeve coinciding with the plane of said slingshot fork; the handle comprises a left half handle and a right half handle, and the upper ends of the left half handle and the right half handle are fixed to a connector at the bottom part of the toy mounted on the handle, forming the whole handle with an internal cavity; the lower-most end of the handle is connected to a handle cover, and the cavity accommodates a cylindrical cookie box.

Preferably, the internal surface of handle has a groove with its cross-section being arc-shaped, and the external surface of the cookie box has a raised edge for matching with the groove. The raised edge can be inserted into the groove after the cookie box is axially placed into the handle and rotated by 90 degrees, so as to secure said cookie box in the handle.

The handle and the handle cover may be connected by a hinge.

The cookie box comprises a fixed pin, a box cover, a spring, a top plate, and a box body. The spring is fixed on the box cover by means of the fixed pin. The top plate is connected with the front end of the spring and can be flexibly placed in the box body. The box cover and the box body can be fastened together by means of threaded connection. A cookie outlet is provided at a side of the front part of the box body.

After the box cover is opened, cookies can be placed in the cookie box; after the box cover is closed, the spring pushes the cookies forward to make them reach the top of the box body. The cookies can be taken out by hand from the cookie outlet provided at the side of the box body; and the spring force continues pushing the cookies to the cookie outlet. For cookies to be taken out, the slingshot is usually reversed and the tail end of the handle is positioned upward in order for the cookies to be conveniently taken out.

Both arms of the slingshot fork are provided with a threading hole and a locking hole respectively. The rubber band may be led to pass through the threading hole and then reversely through the locking hole, and may be secured in the rubber band locking hole by means of a rubber band block pin, so as to fix the rubber band.

A through hole with a diameter of 15 mm~20 mm may be provided at the central part of the shoot pocket, so as to prevent children from using the slingshot to shoot off small stones, thus to provide a safety assurance.

The ball sleeve can be made of engineering plastics, and the gap thereof can make it exhibit a certain degree of elasticity, so that is can clamp small balls and there is no need to pick up the balls by hand.

The left half handle, the right half handle, and their upper ends may be fixed together with a connector at the bottom of the slingshot fork via ultrasonic welding.

The ball sleeve may contain a small ball, which can be shot out by the slingshot and for a pet to pick up; the handle is provided with cookies, which can be used for rewarding the pet, to thereby provide the function of interaction with the pet.

Compared with the prior art, the present invention provides the following beneficial effects: the handle provides storage function, and the slingshot used for installing with such handle can be used for training pets and timely offering the pets some food reward. Thus, the present invention is new and interesting and has relatively high safety factor because it cannot be used for shooting off small stones.

Figure 1:
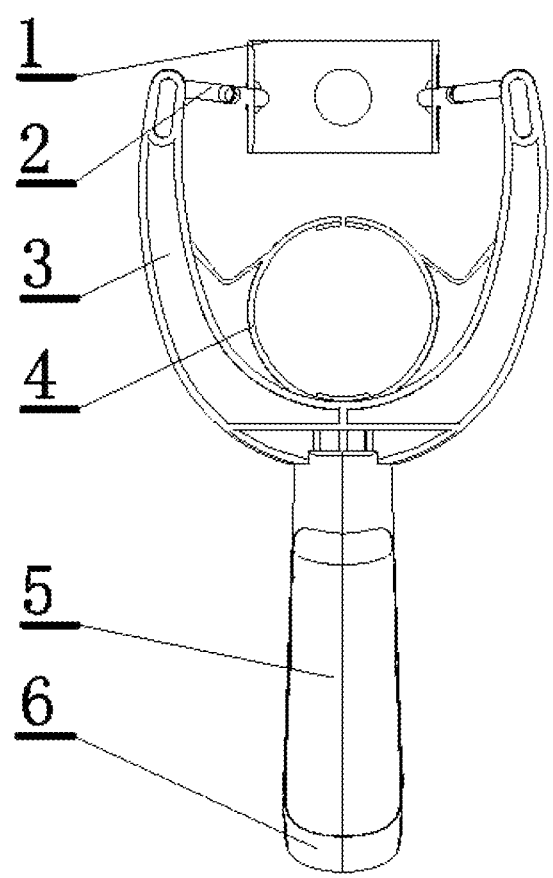
FIG. 1 is a front view by orthographic projection of a toy slingshot for interacting with pets according to a preferred embodiment of the present invention.
Figure 2:
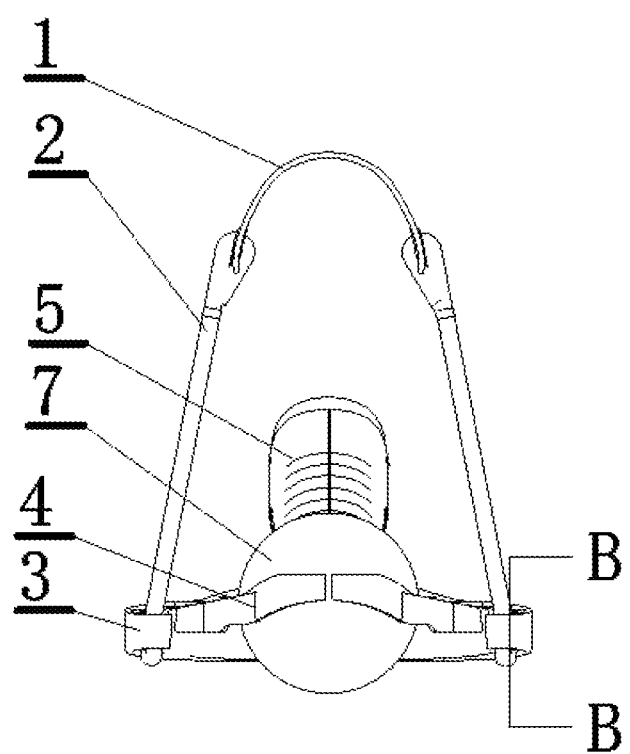
FIG. 2 is a top view of FIG. 1.
Figure 3:
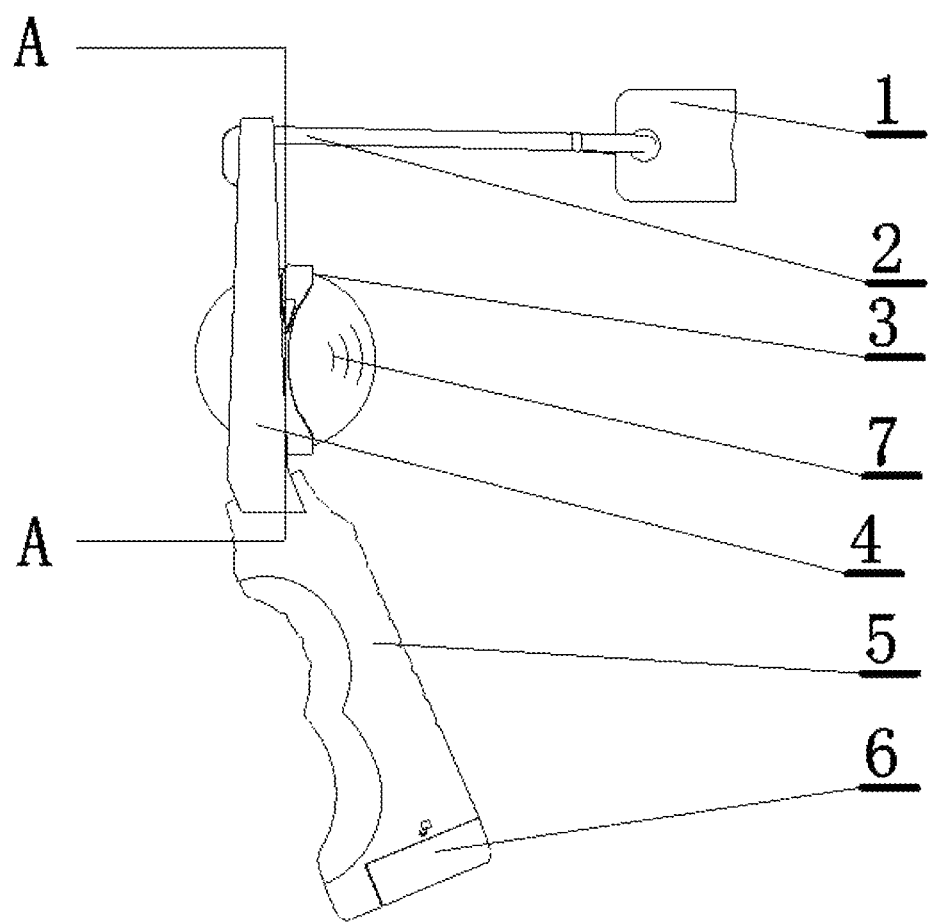
FIG. 3 is a right view of FIG. 1.

In the figures: 1—shooting pocket; 11—shooting pocket hole; 2—rubber band; 3—slingshot fork; 31—rubber band threading hole; 32—rubber band locking hole; 33—connector; 4—ball sleeve; 5—handle; 51—left half handle; 52—right half handle; 521—groove; 6—handle cover; 7—ball; 8—rubber band block pin; 9—cookie box; 91—fixed pin; 92—box cover; 93—spring; 94—top plate; 95—cookies; 96—box body; 961—raised edge; 962—cookie outlet.

DETAILED DESCRIPTION OF THE EMBODIMENTS

With reference to the figures, the present invention is further described below:

In the present invention, as shown in the figures, a toy slingshot for interacting with pets comprises a slingshot fork 3, a rubber band 2 installed on the slingshot fork, a shooting pocket 1 connected to the rubber band 2 and a handle 5 connected to the slingshot fork 3; in particular, a lower position within an opening of the slingshot fork 3 is provided with a circular ball sleeve 4, a top surface of the circular ball sleeve 4 having a gap and the plane of the ball sleeve 4 coinciding with that of the slingshot fork 3; the handle 5 comprises a left half handle 51 and a right half handle 52, and the upper ends of the left half handle 51 and the right half handle 52 are fixed to a connector 33 at the bottom of the slingshot fork 3, forming a whole handle 5 with an internal cavity; the lower end of the handle 5 is connected to a handle cover 6, and the cavity in the handle 5 accommodates a cylindrical cookie box 9.

Figure 6:
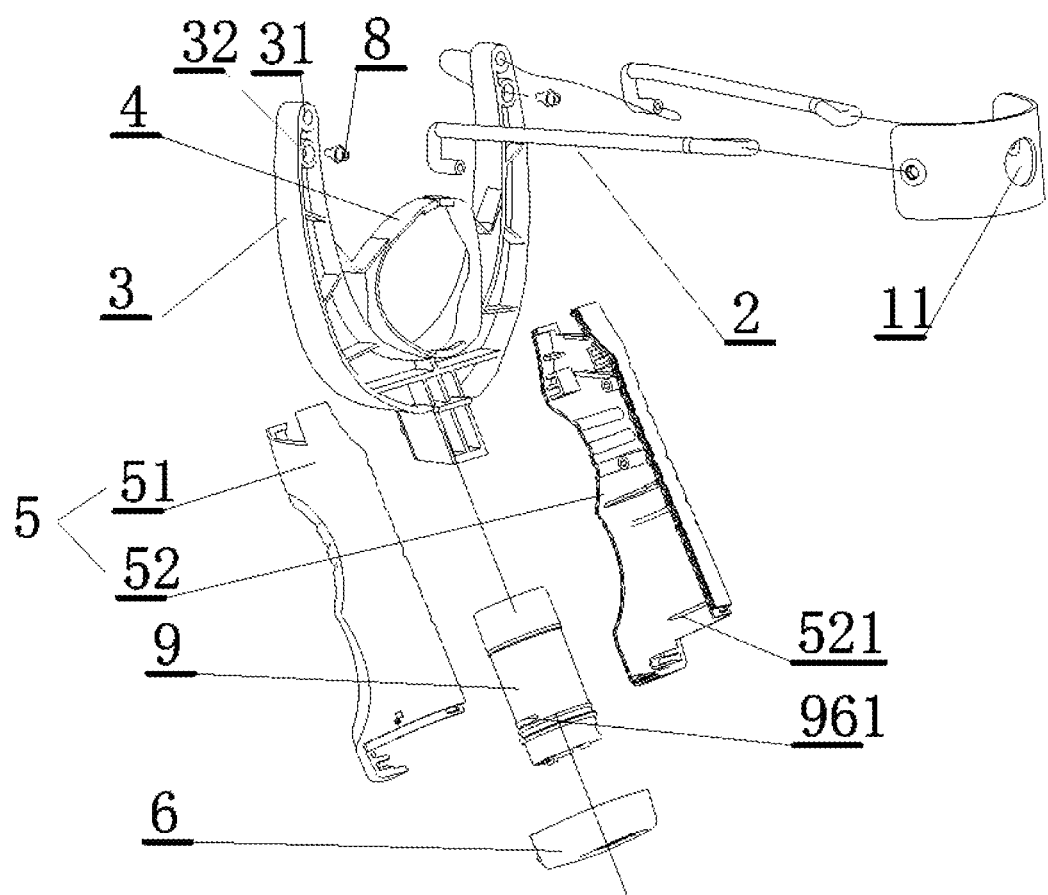
FIG. 6 is a schematic diagram by axonometric projection of the embodiment in a decomposition state, which shows the internal structure of a toy handle 5 for interacting with pets.

In a preferred embodiment of the invention, as shown in FIG. 6, the internal surface of the handle 5 has a groove 521 with an arc-shaped cross-section, and the external surface of the cookie box 9 has a raised edge 961 for matching with the groove; the raised edge 961 can be inserted into said groove 521 after the cookie box 9 is axially placed into said handle and rotated by 90 degrees, so that the cookie box 9 is fixed in the handle 5.

Figure 7:
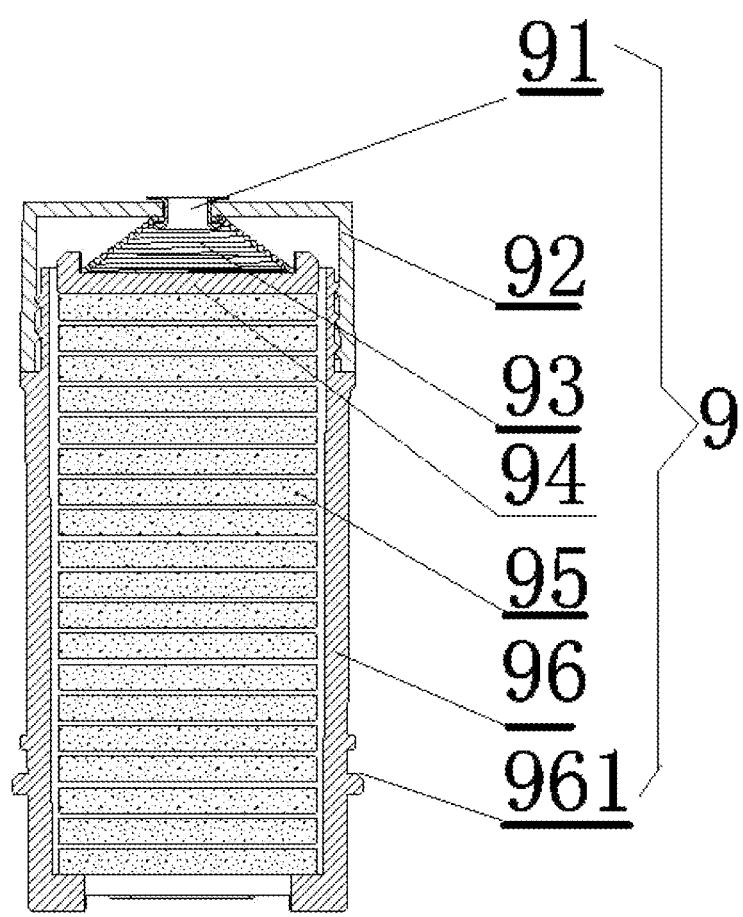
FIG. 7 is a front sectional view by orthographic projection of a cookie box 9.
Figure 8:
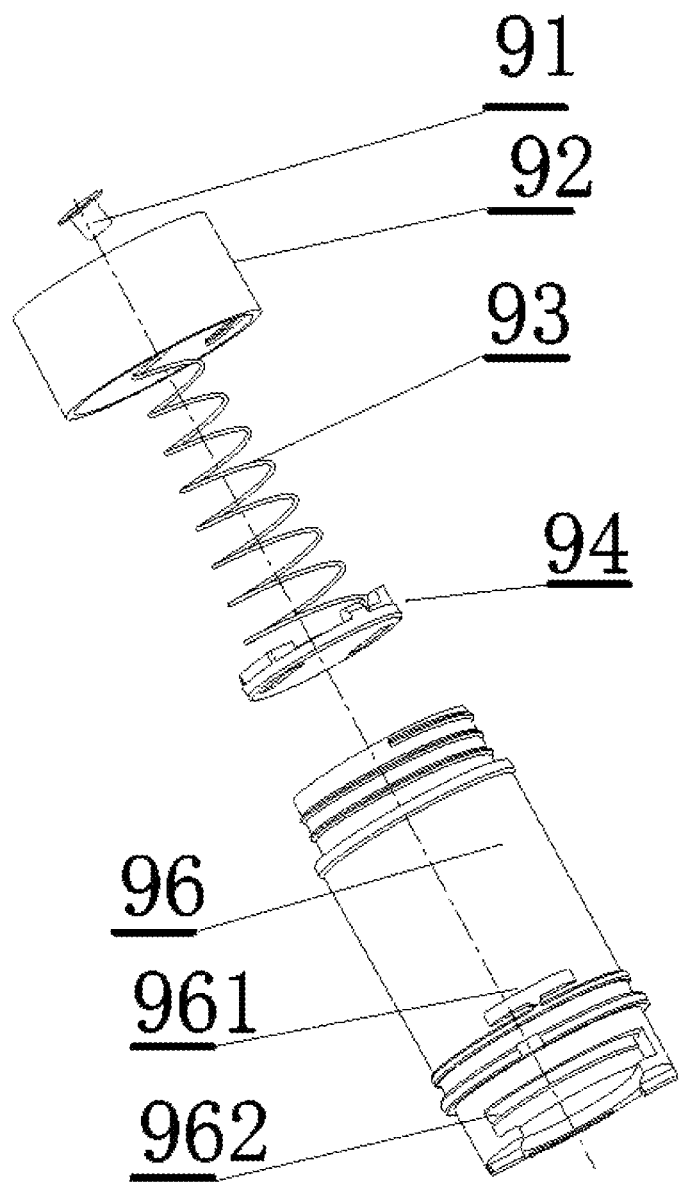
FIG. 8 is a schematic diagram by axonometric projection of the cookie box 9 in a decomposition state.
Figure 9:
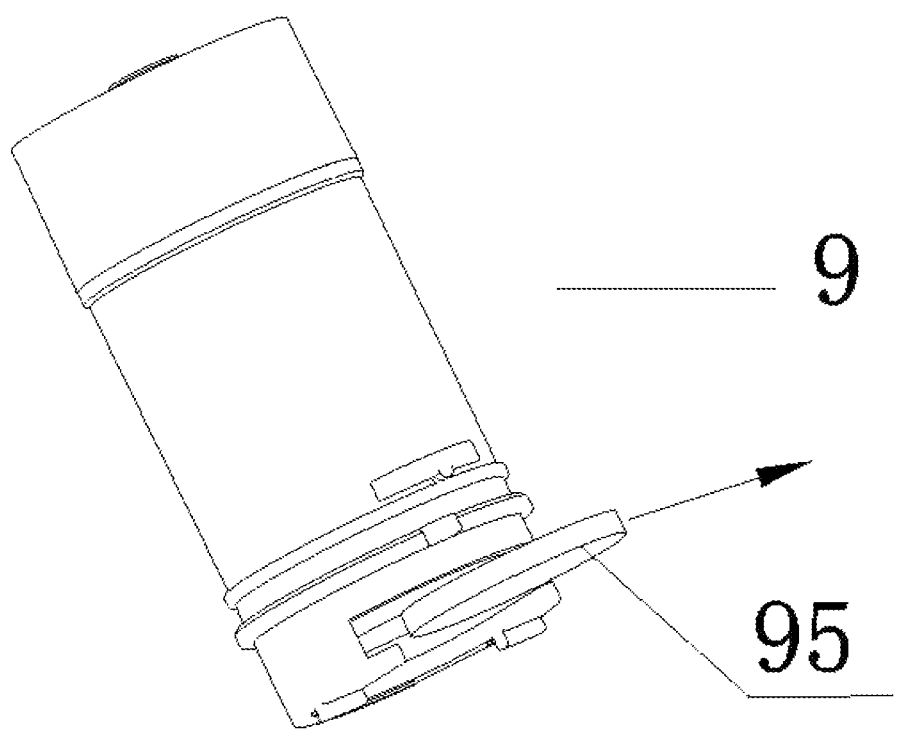
FIG. 9 is a schematic diagram showing a cookie 95 being taken out from the cookie box 9.

As shown in FIGS. 7 and 8, the cookie box 9 comprises a fixed pin 91, a box cover 92, a spring 93, a top plate 94 and a box body 96; the spring 93 is fixed on the box cover 92 by means of the fixed pin 91; the top plate 94 is connected with the front end of the spring 93 and flexibly placed in the box body 96, and the box cover 92 and the box body 96 are fastened together through threaded connection; on the side of the front part of the ox body 96 there is a cookie 95 outlet 962.

After the box cover 92 is opened, cookies 95 can be placed in the cookie box 9; after the box cover 92 is closed, the spring 93 pushes the cookies 95 forward to make them 95 reach the top of the box body 96. The cookies 95 can be taken out by hand from the cookie outlet 962 provided at the side of the box body 96; and the spring force continues pushing the cookies 95 to the cookie outlet 962.

Figure 4:
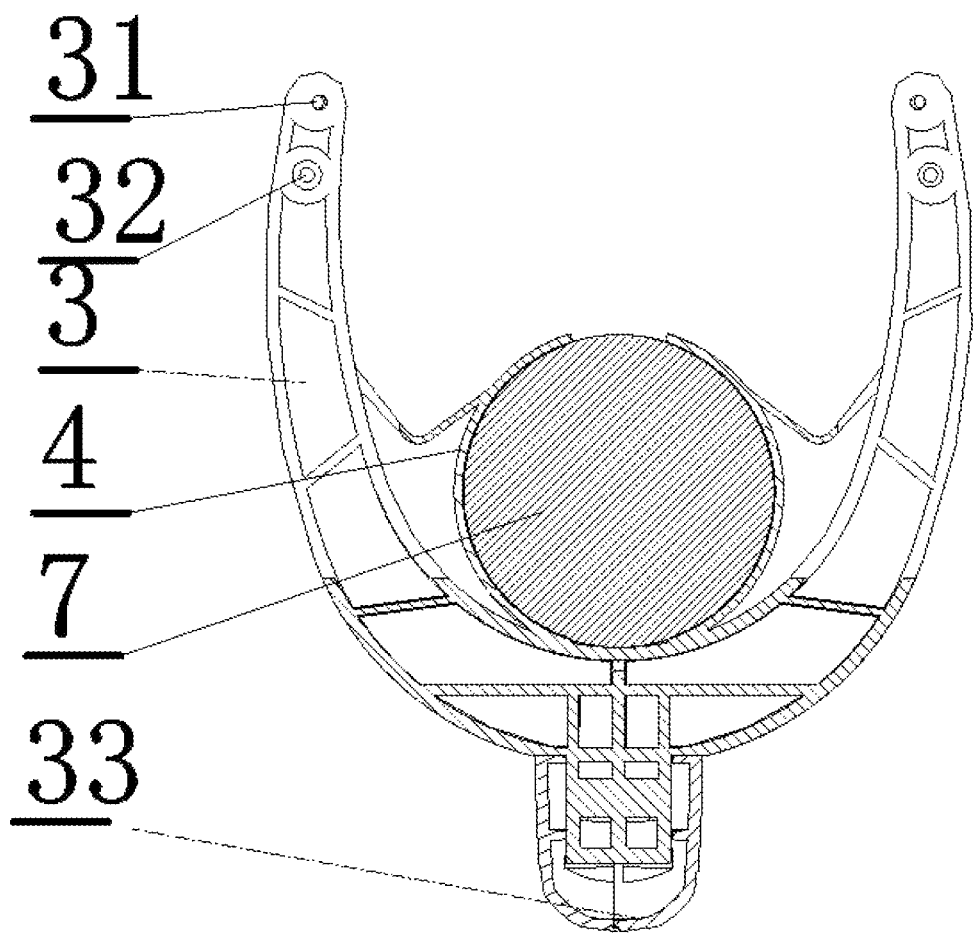
FIG. 4 is a sectional view of FIG. 3 along the A-A line.
Figure 5:
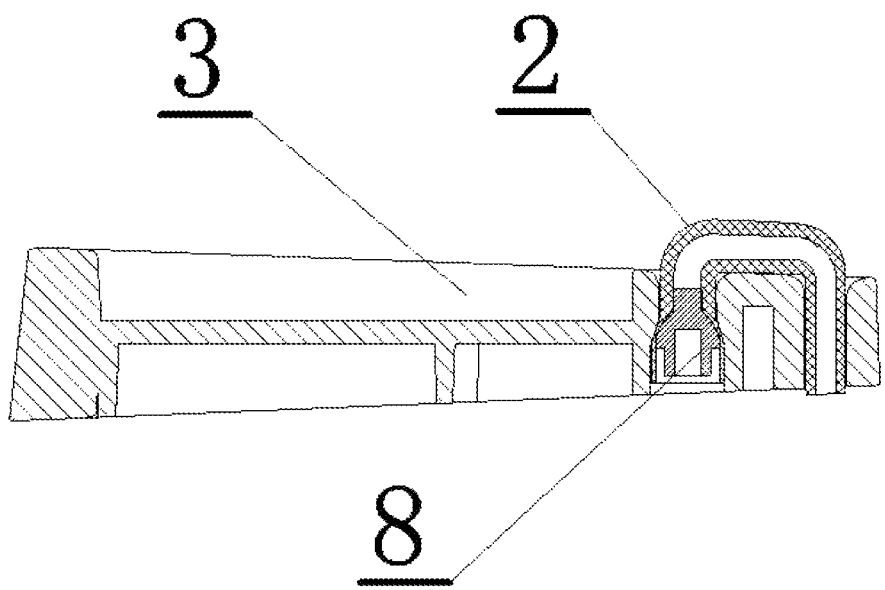
FIG. 5 is a sectional view of FIG. 2 along the A-A line.
Figure 10:
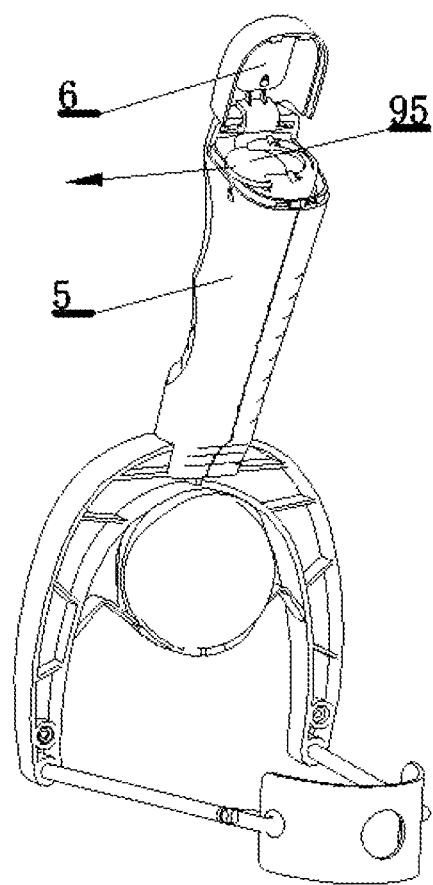
FIG. 10 is a schematic diagram showing a working state where a cookie 95 is being taken out from the cookie box 9 in said embodiment.

As shown in FIG. 10, said handle 5 and said handle cover 6 are hinge jointed. When cookies needed to be taken out, the slingshot is generally reversed and the tail end of the handle is positioned upward in order for the cookies to be conveniently taken out. As shown in FIGS. 4, 5 and 6, two arms of the slingshot fork 3 are provided with a rubber band threading hole 31 and a rubber band locking hole 32 respectively; the rubber band 2 passes through the rubber band threading hole 31 and then reversely through the rubber band locking hole 32, and is locked with a rubber band block pin 8 into said rubber band locking hole 32 so as to fix the rubber band 2.

As shown in FIG. 6, at the central part of the shooting pocket 1 there is a through hole 11 with a diameter of 15 mm~20 mm, which can prevent children from using the slingshot to shoot off small stones, thus to provide a safety assurance.

The ball sleeve 4 can be made of engineering plastics and the gap thereof makes the ball sleeve to exhibit a certain degree of elasticity so that it can clamp small balls.

The left half handle 51, the right half handle 52, and their upper ends can be fixed together with a connector 33 at the bottom of the slingshot fork 3 via ultrasonic welding.

Figure 11:
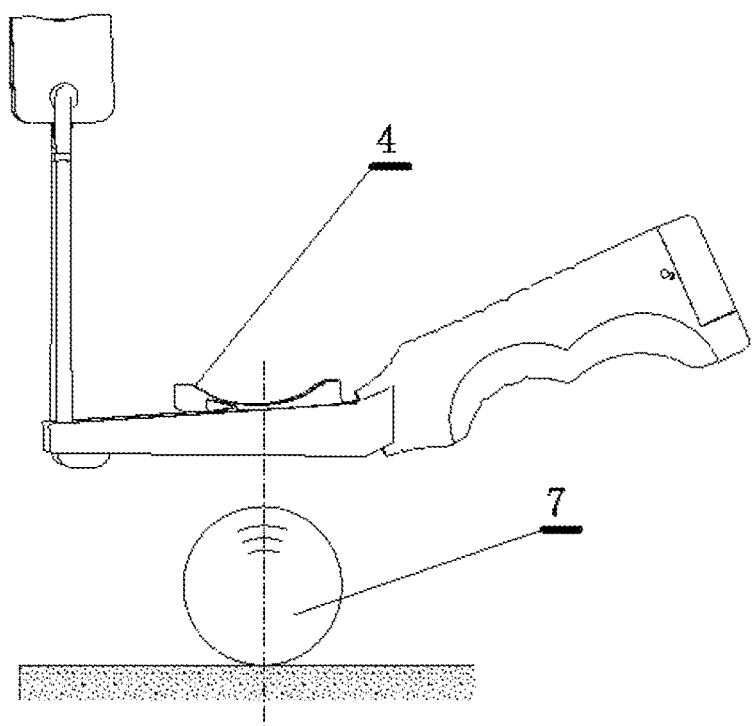
FIG. 11 is a schematic diagram for said embodiment where a ball sleeve 4 is aimed at a ball 7 and is ready to hold the ball.
Figure 12:
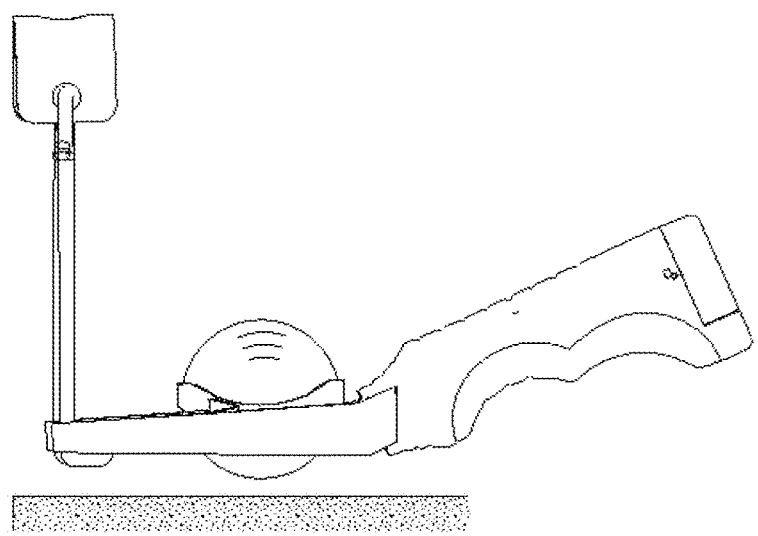
FIG. 12 is a schematic diagram showing a state where the ball 7 is pressed into the ball sleeve 4.

As shown in FIGS. 11 and 12, when a small ball needs to be picked up from the ground, the ball sleeve 4 is aimed at the small ball 7, enabling the slingshot to be pressed toward the ball 7; with its elasticity, the ball sleeve 4 can press the ball into the ball sleeve and clamp the ball.

The invention claimed is:

1. A handle of a toy for interacting with pets, wherein
said handle comprises a left half handle and a right half handle, and upper ends of the left half handle and the right half handle are fixed to a connector at a bottom part of the toy mounted on said handle, forming the whole handle with an internal cavity; the lower-most end of said handle is connected to a handle cover, and the cavity accommodates a cylindrical cookie box; and
an internal surface of said handle is provided with a groove with its cross-section being arc-shaped, and an external surface of said cookie box has a raised edge for matching with said groove; said raised edge can be inserted into said groove after the cookie box is axially placed into said handle and rotated by 90 degrees, so as to secure said cookie box in said handle.

2. The handle of toy for interacting with pets as in claim 1, wherein
said cookie box comprises a fixed pin, a box cover, a spring, a top plate, and a box body; said spring is fixed on the box cover by means said fixed pin; said top plate is connected with a front end of said spring and flexibly placed in the box body; said box cover and said box body are fastened together by means of threaded connection; and an outlet is provided at a side of a front part of the box body.

3. The handle of toy for interacting with pets as in claim 1, wherein:
said handle and said handle cover are connected by a hinge.

4. A toy slingshot for interacting with pets, comprising a slingshot fork, a rubber band installed on said slingshot fork, a shooting pocket connected to said rubber band and a handle connected to said slingshot fork, wherein
a circular ball sleeve is provided at a lower position within a fork opening, a top surface of the circular ball sleeve having a gap, and a plane of said ball sleeve coinciding with a plane of said slingshot fork; said handle comprises a left half handle and a right half handle, and upper ends of the left half handle and the right half handle are fixed to a connector at a bottom part of the toy mounted on said handle, forming the whole handle with an internal cavity; the lower-most end of said handle is connected to a handle cover, and the cavity accommodates a cylindrical cookie box; and an internal surface of said handle is provided with a groove with its cross-section being arc-shaped, and an external surface of said cookie box has a raised edge for matching with said groove; said raised edge can be inserted into said groove after the cookie box is axially placed into said handle and rotated by 90 degrees, so as to secure said cookie box in said handle.

5. The toy slingshot for interacting with pets as in claim 4, wherein
said cookie box comprises a fixed pin, a box cover, a spring, a top plate, and a box body; said spring is fixed on the box cover by means said fixed pin; said top plate is connected with a front end of said spring and flexibly placed in the box body; said box cover and said box body are fastened together through threaded connection; and an outlet is provided at a side of the front end of the box body 96.

6. The toy slingshot for interacting with pets as in claim 4, wherein
two arms of said slingshot fork are provided with a threading hole and a locking hole respectively; the rubber band passes through said threading hole and then reversely through said locking hole, and is secured in said rubber band locking hole by means of a rubber band block pin so as to fix the rubber band.

7. The toy slingshot for interacting with pets as in claim 4, wherein
a through hole with a diameter of 15 mm~20 mm is provided at a central part of said shooting pocket.

8. The toy slingshot for interacting with pets as in claim 4, wherein:
said handle and said handle cover are connected by a hinge.

* * * * *